(12) United States Patent
Nolte

(10) Patent No.: US 7,957,536 B2
(45) Date of Patent: Jun. 7, 2011

(54) METHOD FOR KEY ADMINISTRATION FOR CRYPTOGRAPHY MODULES

(75) Inventor: Michael Nolte, Brakel (DE)

(73) Assignee: Wincor Nixdorf International GmbH (DE)

( * ) Notice: Subject to any disclaimer, the term of this patent is extended or adjusted under 35 U.S.C. 154(b) by 876 days.

(21) Appl. No.: 11/887,658

(22) PCT Filed: Apr. 12, 2006

(86) PCT No.: PCT/DE2006/000655
§ 371 (c)(1),
(2), (4) Date: Sep. 28, 2007

(87) PCT Pub. No.: WO2006/111135
PCT Pub. Date: Oct. 26, 2006

(65) Prior Publication Data
US 2009/0274306 A1    Nov. 5, 2009

(30) Foreign Application Priority Data
Apr. 21, 2005 (DE) .......................... 10 2005 018 676

(51) Int. Cl.
*H04K 1/00* (2006.01)
(52) U.S. Cl. ....................................................... 380/278
(58) Field of Classification Search ................... 380/278
See application file for complete search history.

(56) References Cited

U.S. PATENT DOCUMENTS

| | | | |
|---|---|---|---|
| 5,745,576 A | 4/1998 | Abraham et al. | |
| 5,761,306 A * | 6/1998 | Lewis | 380/282 |
| 5,970,147 A * | 10/1999 | Davis | 713/172 |
| 6,442,690 B1 | 8/2002 | Howard, Jr. et al. | |
| 7,159,114 B1 * | 1/2007 | Zajkowski et al. | 713/171 |
| 7,392,377 B2 * | 6/2008 | Ogg et al. | 713/153 |
| 2001/0026619 A1 * | 10/2001 | Howard et al. | 380/279 |
| 2002/0023217 A1 * | 2/2002 | Wheeler et al. | 713/171 |
| 2002/0078354 A1 * | 6/2002 | Sandhu et al. | 713/171 |
| 2003/0026427 A1 * | 2/2003 | Couillard | 380/277 |
| 2003/0063750 A1 * | 4/2003 | Medvinsky et al. | 380/277 |
| 2003/0101344 A1 * | 5/2003 | Wheeler et al. | 713/170 |
| 2009/0202081 A1 * | 8/2009 | Hammad et al. | 380/285 |

FOREIGN PATENT DOCUMENTS
EP    1 096 446 A2    5/2001

OTHER PUBLICATIONS

Wolfgang Redtenbacher: 'Einführung in das Verschlüsselungsprojekt' http://www.staedtetag-bw.de/Verschluesselung/intro.htm, Feb. 23, 2005.
International Search Report for PCT/DE2006/000655 (in German and English), dated Aug. 7, 2006.

* cited by examiner

*Primary Examiner* — Edan Orgad
*Assistant Examiner* — Harris C Wang
(74) *Attorney, Agent, or Firm* — Harness, Dickey & Pierce, P.L.C.

(57) ABSTRACT

The invention relates to a method for a central key station (SS), for setting a new key (nK) in a cryptography module (KM) without a public key being stored in the cryptography module (KM), the authenticity of the new key (nK) being secured by a protocol. According to said method, the public key (KMpub) of the cryptography module is only transported in an encoded manner and only transmitted to key points (SS) that have access to the cryptography module (KM).

14 Claims, 2 Drawing Sheets

METHOD FOR KEY ADMINISTRATION FOR CRYPTOGRAPHY MODULES

The invention relates to the key administration, that is to say the initialization and updating, of cryptographic keys which are used, in particular, for automatic teller machines and other self-service devices.

Cryptographic methods whose security is based on the security of the keys are used to protect self-service devices, such as cash dispensers, in particular, against unauthorized use. A cash dispenser accordingly contains a sealed cryptography module which stores one or more keys in such a manner that they cannot be read but can only be used for cryptographic transformations, generally after being enabled by a PIN keypad which is an integral part of the cryptographic processor.

When using symmetrical cryptography, in particular, it must be ensured that the key stored in the cryptography module is also present in the host, that is to say in the banking service center in the case of cash dispensers, but only there. Therefore, complicated security measures are required when a key is intended to be installed for the first time or is intended to be interchanged during ongoing operation. Interchange during ongoing operation is effected, as standard, by securely transmitting the new key using the previous key pair. However, that is only possible when the initial key has already been assigned to the host and this assignment is retained. Key interchange is thus only possible as part of the secure application and is thus inflexible.

The patent specification U.S. Pat. No. 5,745,576 describes a method in which a key which is common to all devices and is modified using the device number is only used for key initialization and key interchange. Since the device number must be deemed to be known, the security is now only based on the initialization key which is the same for all cryptography modules.

U.S. Pat. No. 5,761,306 uses an asymmetrical encryption method. The private key is stored in the cryptography module and the public key is stored in a central key station, and the method relates to the interchange of the private and public keys. In this case, hash values are used to authenticate the interchange.

U.S. Pat. No. 6,442,690 likewise proposes using public-key methods and first of all providing each device with a public key, which is signed by a central station, and the associated private key. This key pair is then replaced with another key pair, the known properties of public-key methods being used.

In all of these cases, a public key must be stored in the cryptography module, and only those key changes which are signed using said public key are accepted. Therefore, it is necessary to interchange the public key in the cryptography module in a complicated method.

Therefore, it is an object of the invention to specify a method for key administration which makes it possible to interchange keys for a cryptography module in a secure and simple manner.

The invention achieves this object by means of a method for a central key station for setting a key in a cryptography module without a public key being stored in the cryptography module by protecting the authenticity of the new key using a protocol, in which method the public key of the cryptography module is transported only in encrypted form and is forwarded only to key locations which, for their part, have access to the cryptography module.

Figure 1:
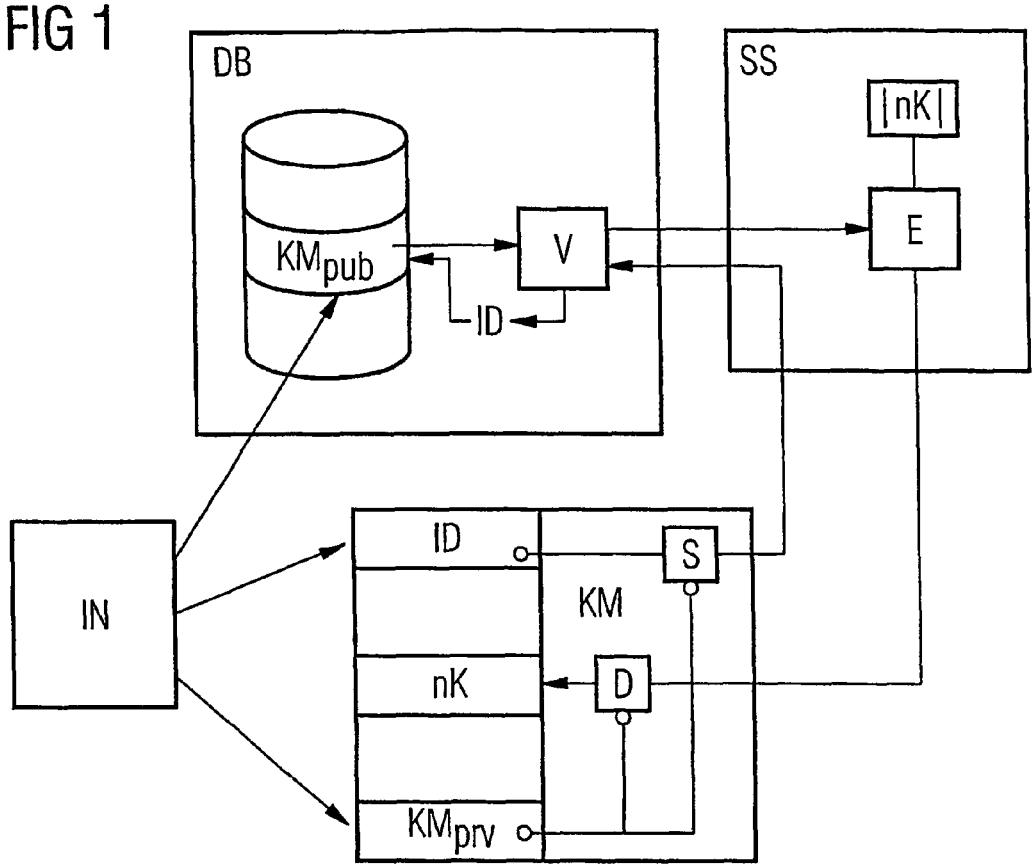
FIG. 1 illustrates a method for the secure transmission of a new key from a key location to a cryptography module according to the present teachings.

The invention is described for a cryptography module which has both symmetrical and asymmetrical encryption and has an alterable key memory for one or more secret keys for symmetrical encryption and a permanent key memory for the private key of asymmetrical encryption. The solution according to the invention does not require a memory for a public key, as is provided in the prior art for protecting authenticity. Furthermore, each cryptography module has a unique device number which is likewise stored inside the cryptography module. Said device number may also be printed on the outside and read electronically; in order to increase the security, however, only a hash value of the device number can be read or is applied to the outside such that it can be read in one variant of the invention. The cryptography module preferably also comprises a buffered clock which can be used to provide the messages, which are described below, with a time stamp so that the validity of the messages can be restricted to a predefined time interval.

In the case of symmetrical encryption, the key must certainly be kept secret as a result of the fact that the same key is used for encryption and decryption; therefore, any message which has been successfully decrypted and has sufficient redundancy which can be checked may also be considered to be authentic at the same time. Since it is not necessary to keep the public key secret in the case of asymmetrical encryption in order to protect confidentiality, it is generally assumed that a second key pair is needed to protect authenticity, the sender signing with his private key and the recipient checking the signature using the associated public key before it decrypts the rest of the message using its own private key. The decisive advantage of asymmetrical encryption is thus precisely that only one key, the private key, needs to be kept secret and the other key, the public key, must only be authentic. If, however, contrary to conventional use, the "public" key is not published at all either but, on the contrary, is kept confidential, successful decryption of a message using the private key simultaneously ensures, in the case of symmetrical encryption, that the message is authentic insofar as it can only come from a location which has the "public" key. In this respect, the term "public key" is not the non-private key of a key pair in asymmetrical encryption in the literal sense within the scope of the present invention; however, it will also continue to be used since it is a generally accepted technical term.

The manufacturer of a cryptography module generates an individual pair of a public key and a private key in a secure area of the production plant and the private key is transmitted to the cryptography module, in which case it is ensured that no further copies remain. The public key is stored in a database under the device number and is protected both against loss of data and against illegitimate access. When a hash value is used, the hash value is used as a key and the plain text device number is stored together with the public key.

The cryptography module comprises a function which can be used to write a particular secret key for symmetrical encryption. This key is protected on the way to the cryptography module by being encrypted with the public key associated with the private key contained in the cryptography module using asymmetrical encryption. As already explained, successful decryption is simultaneously proof that the sender had the public key.

This is, on the one hand, the manufacturer of the cryptography module who indeed originally has the public key. Although the user of the cryptography module must have a considerable amount of faith in the manufacturer anyway that there is no lack of security, it is not expedient to first of all transmit the new secret keys, which will be concomitantly decisive in future to the security of operation and are generated by the key location, to the manufacturer of the cryptography module and to have them encrypted there with the public key. This is not expedient, in particular, when personalization and manufacture are separate from one another.

Rather, the invention provides for the public key to be transmitted from the manufacturer of the cryptography module to the current or future operator and to be used there in a key central station, which generates the new secret key, to encrypt the message for the cryptography module. This operation of transmitting the public key to the cryptography module is carried out according to the invention with secure authenticity and confidentiality. This may be effected using means which already exist, for example by means of cryptographically secure messages in accordance with the SOAP protocol or using HTTPS connections.

FIG. 1 shows a corresponding sketch. The initialization means IN generates the key pair $KM_{pub}$ and $KM_{prv}$ and the device number ID and transmits them to the secure database DB and the cryptography module KM. The two components (KM and DB) are in a secure environment with the same common level of security. The cryptography module KM has a memory for the device number ID, the key nK which is to be newly set and the private key $KM_{prv}$. A signing function S of the cryptography module KM generates an identification data record which contains the device number ID and is signed using the private key $KM_{prv}$. In addition, the cryptography module is provided with a decryption function D which can decrypt a data record using the new key nK. The public key $KM_{pub}$ can be accessed in the secure database DB using the ID. A comparator V takes the device number ID from the identification data record, which is generated by the signing function S, uses said device number to determine the public key $KM_{pub}$, checks the signature of the ID and sends the public key $KM_{pub}$ to the key location SS if the check is positive. The key location SS has an encryption device E which can be used to encrypt the new key nK, which is generated by the key location, using the public key $KM_{pub}$ received from the secure database DB. The key location SS sends this encrypted key nK to the cryptography module KM where it is decrypted by D.

Figure 2:
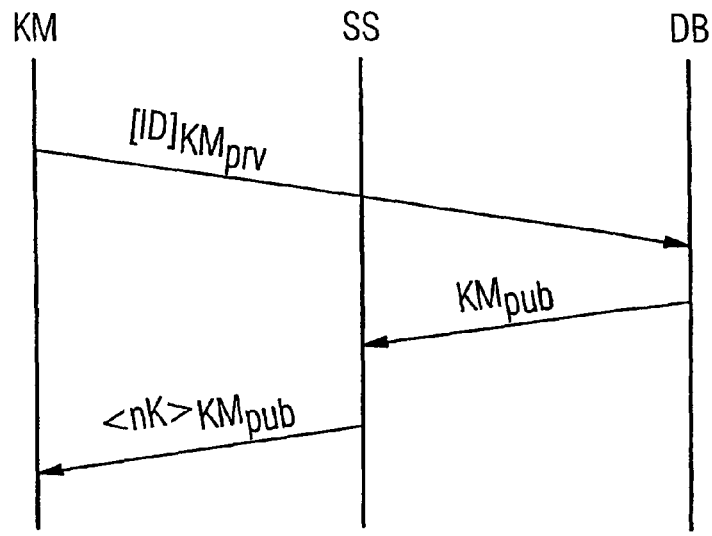
FIG. 2 is an additional illustration of the method of FIG. 1.
Figure 3:
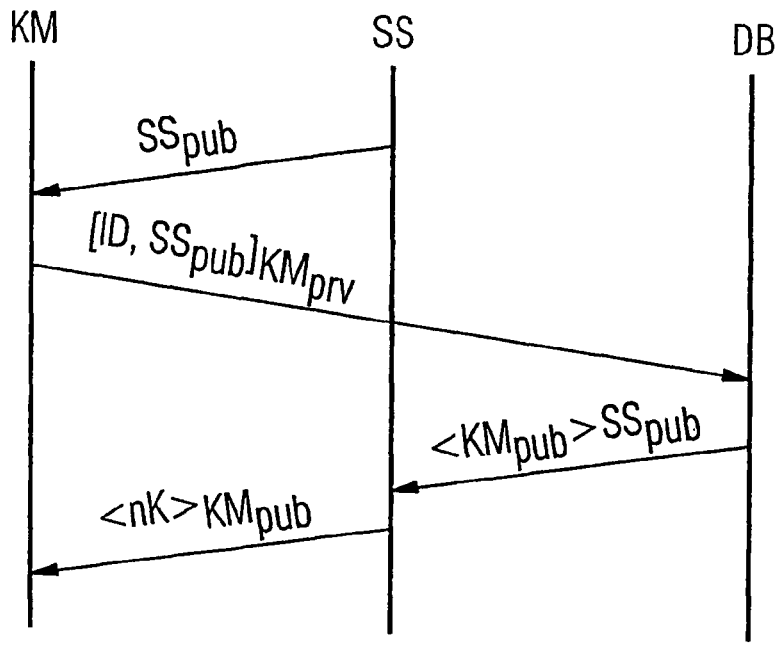
FIG. 3 illustrates another method for the secure transmission of a new key from a key location to a cryptography module according to the present teachings.
Figure 4:
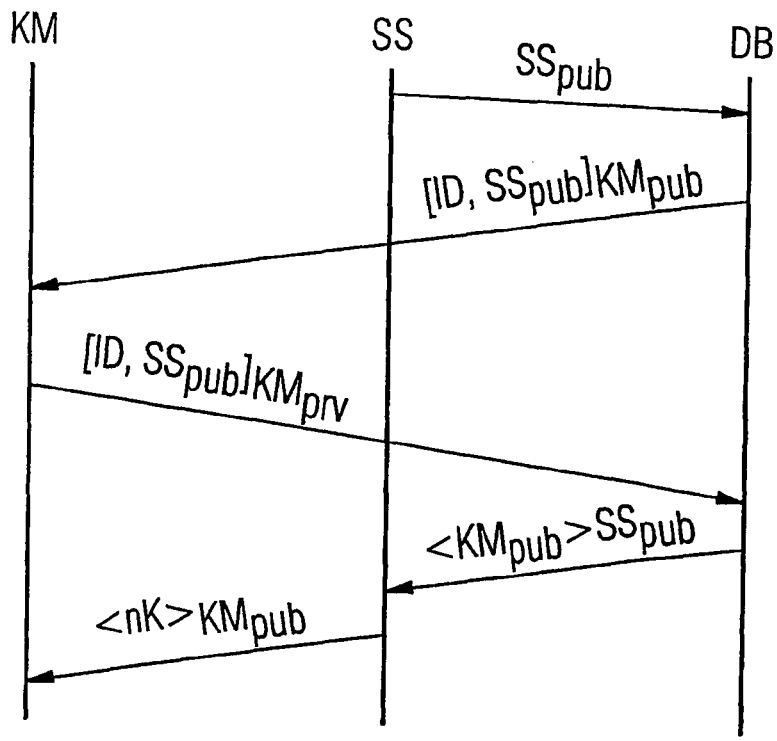
FIG. 4 illustrates a further method for the secure transmission of a new key from a key location to a cryptography module according to the present teachings.

In the protocol diagrams of FIG. 2 to FIG. 4, the operation of signing data is symbolized using square brackets with an appended key and encryption is symbolized using arrow brackets. The vertical bars with the designations KM, SS and DB represent the cryptography module, the key location and the secure database.

FIG. 2 shows the further sequence in symbolic form: the cryptography module KM sends the identification data record $[ID]_{KMprv}$, via the key location SS, to the secure database DB which, after checking, sends the public key $KM_{pub}$ back to the key location SS. The latter generates the encrypted new key $<nK>_{KMpub}$. The public key $KM_{pub}$ is thus stored in a separate database rather than in the cryptography module and is used to encrypt the new key nK which is decrypted using the private key in the cryptography module.

The preferred embodiment of the invention integrates further measures for protecting integrity and confidentiality. The sequence of such an improved variant is illustrated in FIG. 3.

To this end, the key location SS first of all sends a request data record containing the public key $SS_{pub}$ of the key location, which need not be kept confidential in this case either, to the cryptography module. This public key is incorporated into the identification data record [ID, $SS_{pub}]_{KMprv}$ and is signed, together with the device number, using the private key of the cryptography module and is sent back to the key location. Since the data record is signed rather than encrypted, the key location can and will check whether the device number and its own public key are contained in the identification data record. It is not yet possible to check the signature since the key location does not yet have the public key $KM_{pub}$ of the cryptography module.

The key location uses any desired connections, in particular also web services, to send the identification data record as a request to the secure database DB of the manufacturer of the cryptography module KM. The latter uses the device number ID to find the data record containing the public key $KM_{pub}$ and then checks the signature of the identification data record using the public key $KM_{pub}$ of the cryptography module which has been found and has hitherto been present only here. This ensures that the public key $KM_{pub}$ is forwarded only to a key location SS which has access to the corresponding cryptography module KM.

If the signature matches, a preparation data record $<KM_{pub}>_{SSpub}$ containing the public key of the cryptography module is generated. This preparation data record is encrypted using the public key $SS_{pub}$ of the key location, is optionally also signed with a private key of the secure database and is sent back to the key location SS. This ensures that the public key of the cryptography module is accessible only to the key location SS.

The key location SS which has its own private key $SS_{prv}$ can now decrypt the preparation data record and remove the public key $KM_{pub}$ of the cryptography module.

Using the latter, as previously, a setting data record $<nK>_{KMpub}$ which contains the new key nK is encrypted using the public key $KM_{pub}$ of the cryptography module KM and is transmitted to the latter which, as previously, decrypts the data record and enters the new key nK after checking the redundancy. It is not necessary but it is expedient to concomitantly incorporate the device number ID into the setting data record.

This variant still has the disadvantage that the public key of the key location is transmitted to the cryptography module KM in a non-secure manner, said cryptography module not being able to use the public key to check whether the request is authorized.

In the preferred development according to FIG. 4, this is prevented by the key location SS first of all having the secure database DB encrypt the request data record, which contains the public key $SS_{pub}$ of the key location, using the public key $KM_{pub}$ of the cryptography module KM by specifying the device number ID. The request data record will generally concomitantly contain the device number (ID); but this is not necessary. In order to protect this operation, the secure database has a list of the public keys of the key locations, with the result that only a registered key location can receive an encrypted request data record. In this embodiment, the cryptography module decrypts each request data record before further processing using its own private key $KM_{prv}$, so that an unauthorized request can be rejected and the identification data record needed to acquire the public key is not generated at all.

In the two embodiments according to FIG. 3 and FIG. 4, it is additionally expedient for the key location SS to additionally sign the identification data record using its own private key $SS_{prv}$ and for this signature to be checked by the secure database (DB). The public key contained in the data record can be used for this purpose, on the one hand. It is better if, as in the embodiment according to FIG. 4, the secure database (DB) contains a list of the public keys of the key locations and concomitantly uses it, said list being protected using other means.

In another variant of the invention according to FIG. 3 or FIG. 4, the cryptography module encrypts the identification data record using the public key $SS_{pub}$ of the key location SS. The latter decrypts the identification data record and signs it before forwarding it to the secure database DB. It is also possible to dispense with the signing.

In another variant, the database DB may additionally also have a key pair $DB_{prv}$ and $DB_{pub}$ in order to make the interchange with SS, IN and KM even more secure. The initialization means IN may also have a key pair $IN_{prv}$ and $IN_{pub}$ for an even more secure connection to DB and KM.

As already indicated above, the cryptography module KM also contains a clock and sets and checks time stamps in the data records which are transmitted and received in order to prevent older data records from being repeated. In order to support this function, the cryptography module KM also contains a register which stores the time stamp of the last identification data record generated and accepts a setting data record only within a predetermined period of time thereafter.

In another development, the cryptography module KM has a random number generator and a memory for a random number. Each identification data record additionally contains a random number which must again be contained in the setting data record so that the function is carried out. In addition, this memory is erased as soon as a setting data record is received, so that obsolete setting data records are not repeated. A counter can also be used instead of a random number for which a generator is generally present in the cryptography module KM anyway.

Known measures for protecting the data records against cryptoanalysis, such as the insertion of serial numbers and random numbers during encryption, are familiar to a person skilled in the art and are not mentioned in any more detail.

Since the properties of the encryption associated with the key memories do not play a role, the keys for asymmetrical encryption may also be set, as an alternative or in mixed form, instead of secret keys for symmetrical encryption.

The invention claimed is:

1. A method for the secure transmission of a new key from a key location to a cryptography module which comprises, for this purpose, a key memory which can be written to and, in addition, a further key memory for a private key, said method having the following steps:

a device number for the cryptography module and a key pair comprising a private key and a public key are generated in a secure environment for an asymmetrical encryption method, the private key is transmitted to the cryptography module and the public key is stored in a secure database under the device number;

the key location reads a first data record, which contains the device number and is signed using the private key, from the cryptography module and transmits it to the secure database;

the secure database determines the public key with the aid of the device number uses said key to check the signature of the data record containing the device number and sends the public key back to the key location;

the key location generates a setting data record, which contains the new key and is encrypted using the public key of the cryptography module, and sends this setting data record to the cryptography module;

the cryptography module decrypts the setting data record, checks the redundancy contained therein and sets the new key.

2. A method for the secure transmission of a new key from a key location to a cryptography module which comprises, for this purpose, a key memory which can be written to and, in addition, a further key memory for a private key, said method having the following steps:

a device number and a key pair comprising a private key and a public key are generated in a secure environment for an asymmetrical encryption method, the private key is transmitted to the cryptography module and the public key is stored in a secure database under the device number;

the key location has a key pair for asymmetrical encryption and sends a request data record containing its public key to the cryptography module;

the cryptography module generates an identification data record, which contains the device number and the public key of the key location and is signed using the stored private key and sends it to the key location which forwards it to the secure database;

the secure database determines the public key of the cryptography module with the aid of the device number, uses said key to check the signature of the identification data record, generates a preparation data record, encrypts the latter using the public key of the key location, which is taken from the identification data record, and sends this preparation data record back to the key location;

the key location decrypts the preparation data record and generates a setting data record, which contains the new key and is encrypted using the public key of the cryptography module, which is taken from the preparation data record, and sends this setting data record to the cryptography module;

the cryptography module decrypts the setting data record, checks the redundancy contained therein and sets the new key.

3. The method as claimed in claim 2, the identification data record being additionally signed by the key location using its private key and the secure database checking this signature before further processing.

4. The method as claimed in claim 2, the key location requesting the request data record, which contains the public key of the key location and is encrypted using the public key of the cryptography module, from the secure database in the second step by specifying the device number.

5. The method as claimed in claim 4, the identification data record being encrypted by the cryptography module using the public key of the key location, being decrypted by the key location using its private key and being encrypted with a public key of the secure database before being forwarded to the secure database.

6. The method as claimed in claim 1, the cryptography module containing a clock, the data records which have been interchanged containing time stamps or validity time intervals and the process of checking the signature and redundancy comprising this time information with respect to predefined limits.

7. The method as claimed in claim 6, the cryptography module also containing a memory for a time stamp, the time at which an identification data record is created being stored in said memory, and the cryptography module executing a setting data record only within a predetermined period of time after the last stored time at which an identification data record was created.

8. The method as claimed in claim 1, the cryptography module comprising a further memory and a generator for a random value, inserting the latter into the data record at that key location which inserts the random value into the setting data record, and the cryptography module checking the random value for similarity when checking the redundancy.

9. The method as claimed in claim 1, the database having a public key and a private key which can be used to encrypt data records which are interchanged between the key location, the initialization means and the cryptography module.

10. The method as claimed in claim 1, the initialization means having a public key and a private key which can be used to encrypt data records which are interchanged between the key location, the database and the cryptography module.

11. The method as claimed in claim 1, the method as claimed in one of claims 1 to 10 being used in a self-service device, in particular a cash dispenser.

12. A cryptography module for carrying out one of the methods as claimed in claim 1, the cryptography module containing a means for generating an identification data record, which comprises the device number and is signed using the stored private key, and a means for setting a key memory using a new key after a setting data record has been received, which means decrypt the setting data record using the stored private key before said data record is executed.

13. The cryptography module as claimed in claim 9, an identification data record being created in response to a request data record which is decrypted using the secret key, is checked for plausibility and is accepted into the identification data record in full or in part before the latter is signed.

14. The cryptography module as claimed in claim 1, the cryptography module as claimed in claim 12 or 13 being used in a self-service device, in particular a cash dispenser.

* * * * *